United States Patent
Stout et al.

(10) Patent No.: US 7,230,363 B2
(45) Date of Patent: Jun. 12, 2007

(54) LOW PROFILE GENERATOR CONFIGURATION

(75) Inventors: David E. Stout, Tucson, AZ (US); Wayne T. Pearson, Tucson, AZ (US); Mingzhou Xu, Tucson, AZ (US); Michael W. Duddeck, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 16 days.

(21) Appl. No.: 10/812,725

(22) Filed: Mar. 30, 2004

(65) Prior Publication Data
US 2005/0218740 A1   Oct. 6, 2005

(51) Int. Cl.
*H00K 1/22* (2006.01)

(52) U.S. Cl. ............... 310/266; 310/115; 310/126; 310/112

(58) Field of Classification Search .......... 310/179, 310/261, 254, 216, 112–115, 126, 266, 68 R, 310/809, 264; 318/811
See application file for complete search history.

(56) References Cited

U.S. PATENT DOCUMENTS

| | | | | |
|---|---|---|---|---|
| 396,355 A | 1/1889 | Dyer | | 310/114 |
| 1,977,950 A | 10/1934 | Morhard | | 310/166 |
| 1,998,142 A * | 4/1935 | Meyertons | | 310/166 |
| 2,142,067 A * | 12/1938 | Allen | | 310/127 |
| 3,248,584 A | 4/1966 | Knauer | | 310/171 |
| 3,445,699 A | 5/1969 | Beaudry et al. | | 310/125 |
| 3,549,923 A | 12/1970 | Kurakin | | 310/162 |
| 3,624,440 A | 11/1971 | Latussek | | 310/162 |
| 3,676,764 A * | 7/1972 | Syverson | | 322/51 |
| 4,647,806 A * | 3/1987 | Giuffrida | | 310/68 D |
| 5,345,133 A | 9/1994 | Satake | | 310/266 |
| 5,723,928 A | 3/1998 | Imai et al. | | 310/114 |
| 5,783,893 A * | 7/1998 | Dade et al. | | 310/266 |
| 6,093,992 A * | 7/2000 | Akemakou | | 310/156.55 |
| 6,201,331 B1 | 3/2001 | Nakano | | 310/114 |
| 6,211,597 B1 | 4/2001 | Nakano | | 310/266 |
| 6,236,134 B1 * | 5/2001 | Syverson | | 310/181 |
| 6,373,160 B1 * | 4/2002 | Schrodl | | 310/114 |
| 6,380,653 B1 | 4/2002 | Seguchi | | 310/112 |
| 6,380,655 B1 | 4/2002 | Ide et al. | | 310/211 |
| 6,400,060 B1 | 6/2002 | Pfleuger et al. | | 310/156.45 |
| 6,459,185 B1 | 10/2002 | Ehrhart et al. | | 310/263 |
| 6,590,312 B1 | 7/2003 | Seguchi et al. | | 310/266 |
| 6,639,337 B1 * | 10/2003 | Nakano | | 310/113 |
| 6,768,237 B1 * | 7/2004 | Schroedl | | 310/114 |

* cited by examiner

*Primary Examiner*—Dang Le
(74) *Attorney, Agent, or Firm*—Ingrassia Fisher & Lorenz

(57) ABSTRACT

One embodiment of the invention relates to a low profile electric generator having a short axial length. A cylindrical rotor body defines an interior cavity and is coupled to a driveshaft along the axis of the cylindrical body. A first rotor assembly is coupled to the inner surface of the cylindrical body, the first rotor assembly defining a space to receive a first stator that is independent from the cylindrical body. A second rotor assembly is coupled to the outer surface of the cylindrical body and electrically coupled to the first rotor assembly. A second stator is arranged around the second rotor assembly, independent from the cylindrical body, and radially positioned about the axis of the cylindrical body. By arranging the generator components in such configuration, the axial length of the generator is reduced in comparison to a conventional generator.

18 Claims, 5 Drawing Sheets

LOW PROFILE GENERATOR CONFIGURATION

FIELD OF THE INVENTION

Various embodiments of the invention pertain to electric generators and motors. More particularly, one embodiment of the invention pertains to a low profile electric generator assembly.

DESCRIPTION OF RELATED ART

Wound-type induction machines have long been used as electric generators and motors. In electrical generators, such as those used to power the electrical systems of aircraft, the generator is connected to the main engine by a driveshaft. The rotor assembly is mounted on the driveshaft and rotates within the stator assembly. FIG. 1 illustrates a conventional wound-type electric generator 100 having an exciter assembly 102 and 104 adjacent and inline with a main assembly 106 and 108. A typical electric generator 100 comprises a driveshaft 110 having a substantially cylindrical exciter rotor 104 at a first end and a substantially cylindrical main rotor 108 at a second end. An exciter stator 102 defines a first cylindrical cavity in which to receive the exciter rotor 104 and a main stator 106 defines a second cylindrical cavity in which to receive the main rotor 108. The exciter stator 102, exciter rotor 104, main stator 106, and main rotor 108 typically include one or more electrical windings or coils. By mounting the exciter assembly 102 and 104 and the main assembly 106 and 108 adjacent to each, other the overall diameter of the generator/motor 100 is minimized. However, such configuration increases the axial length of the generator/motor 100. In certain applications, it may be desirable to have a generator that has a low profile or axial length in order to fit such generator into a limited space, or to limit the overhung moment of the generator.

SUMMARY OF THE INVENTION

Figure 1:
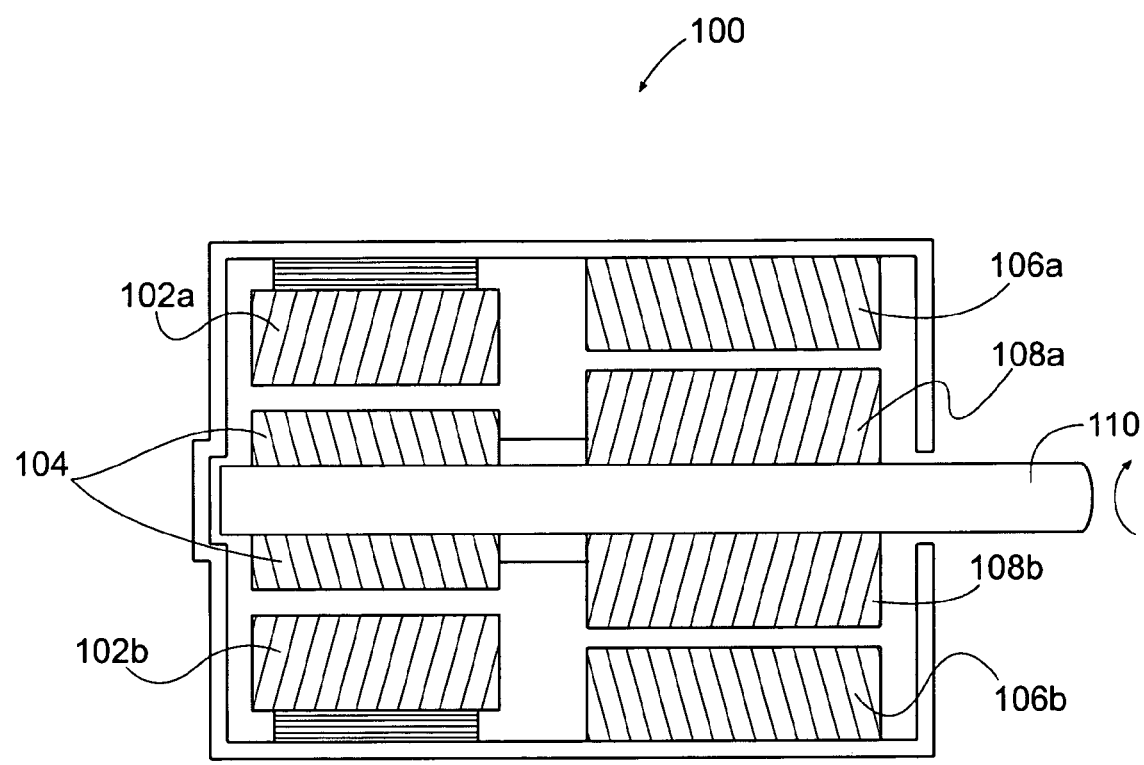
FIG. 1 illustrates a conventional wound-type electric generator having an exciter assembly adjacent to a main assembly.

One embodiment of the invention relates to a low profile electric generator having a short axial length. A cylindrical rotor body defines an interior cavity and is coupled to a driveshaft along the axis of the cylindrical body. A first rotor assembly is coupled to the inner surface of the cylindrical body, the first rotor assembly defining a space to receive a first stator that is independent from the cylindrical body. A second rotor assembly is coupled to the outer surface of the cylindrical body and electrically coupled to the first rotor assembly. A second stator is arranged around the second rotor assembly, independent from the cylindrical body, and radially positioned about the axis of the cylindrical body. By arranging the generator components in such configuration, the axial length of the generator is reduced in comparison to a conventional generator.

According to one embodiment of the invention, when a direct current is applied to the first stator, the direct current generates a static magnetic field which induces an alternating current in the first rotor assembly when the driveshaft and cylindrical body are rotated. The alternating current in the first rotor assembly is rectified to generate a direct current in the second rotor assembly. The direct current in the second rotor assembly generates a magnetic field which, in turn, induces an alternating current in the second stator. One or more rectifying diodes coupled between the first rotor assembly and the second rotor assembly are employed to transform the alternating current in the first rotor assembly into a direct current in the second rotor assembly.

DETAILED DESCRIPTION

Devices and apparatus that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

In the following description, certain terminology is used to describe certain features of one or more embodiments of the invention. The term "windings" includes wound-type coils and similar devices. The term "generator" includes motors, electrical generators, induction machines, etc.

One embodiment of the invention provides for repositioning an exciter generator assembly that is radially positioned within a main generator assembly to minimize an overall generator length. One feature of the invention provides improved support for the windings of the exciter rotor under high centrifugal loading.

Figure 2:
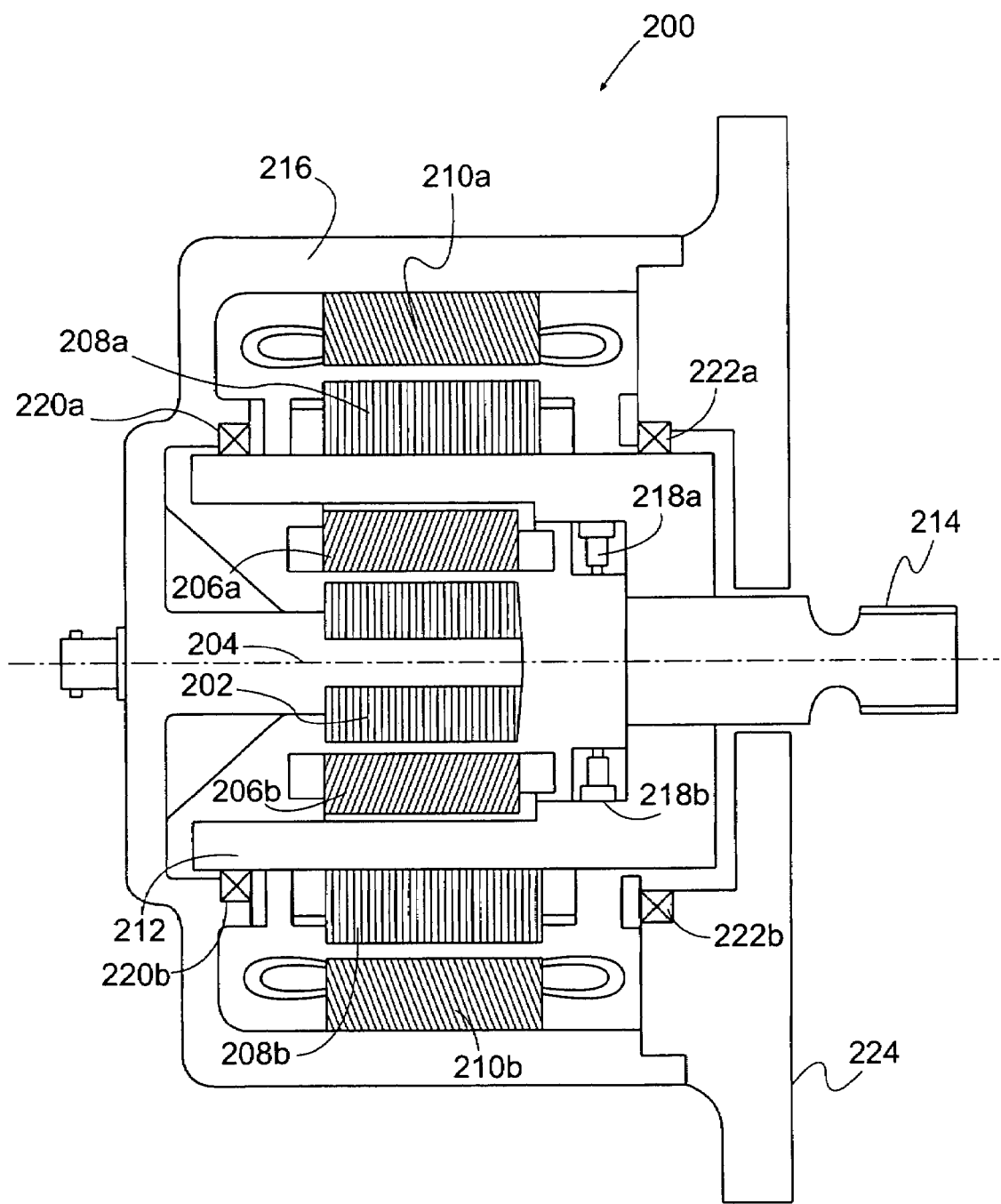
FIG. 2 illustrates a cross-sectional view of an electric generator according to one embodiment of the invention.

FIG. 2 illustrates a cross-sectional view of an electric generator 200 according to one embodiment of the invention. The generator 200 includes a main assembly 208 and 210 mounted concentrically with an exciter assembly 202 and 206. The exciter assembly includes an exciter stator 202 mounted on a support member 204 and positioned within a cylindrical cavity formed by an exciter rotor 206. The exciter rotor 206 windings are mounted inside a cylindrical rotor frame 212 which is coupled to a driveshaft 214 at its base. The main assembly includes a main rotor 208 mounted on the outer surface of the cylindrical rotor frame 212 and inside a cylindrical cavity formed by a main stator 210, which is mounted on the inner surfaces of the generator enclosure 216. The exciter stator support member 204 may be coupled to the generator enclosure 216 such that the exciter stator 202 is substantially aligned with the driveshaft 214 and rotor frame 212. By configuring and arranging the exciter assembly and main assembly in this manner, the overall axial length of the generator 200 is reduced.

Each of the main stator 210, exciter stator 202, main rotor 208, and exciter rotor 206 may include one or more electrical windings. One or more diodes 218 may be disposed between the windings of the exciter rotor 206 and corresponding windings of the main rotor 208. One or more upper bearings 220 and/or lower bearings 222 may enable the rotor frame to rotate within the generator enclosure 216. A flange 224 may receive the generator enclosure 216 and enclose the generator 200.

Figure 3:
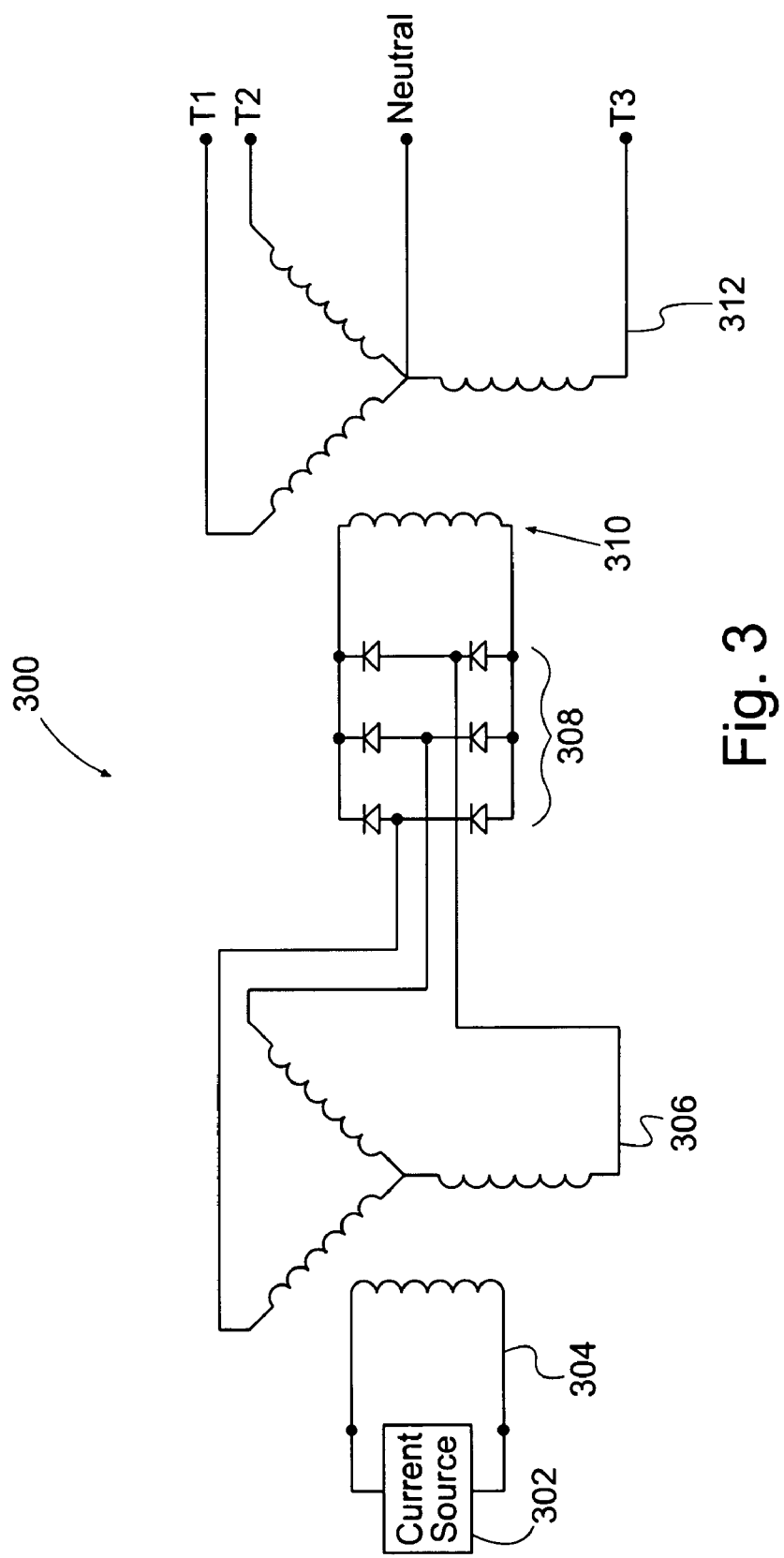
FIG. 3 is a circuit diagram illustrating an electric generator according to one embodiment of the invention.

FIG. 3 is a circuit diagram of an electric generator 300 according to one embodiment of the invention. This circuit diagram describes the operation of the generator 200 illustrated in FIG. 2. A voltage regulator 302, external to the generator 300, provides a direct current to the exciter stator 304 field winding to setup a static magnetic field. When the driveshaft 214 is rotated by an external drive force, the static magnetic field generated by the exciter stator 304 (e.g., 202 in FIG. 2) induces a three-phase voltage in the rotating exciter rotor 306 (e.g., 206 in FIG. 2) armature and an alternating current output. A plurality of rotating diodes 308 (e.g., 218 in FIG. 2) are arranged in a three-phase full-wave bridge configuration and transform the alternating current output of the exciter rotor 306 into a direct current necessary to produce a magnetic field in the main rotor 310 (e.g. 208 in FIG. 2). In turn, the magnetic field generated by the main rotor 310 induces a three-phase voltage (e.g., T1, T2, T3) and alternating current output in the main stator 312 windings.

Figure 4:
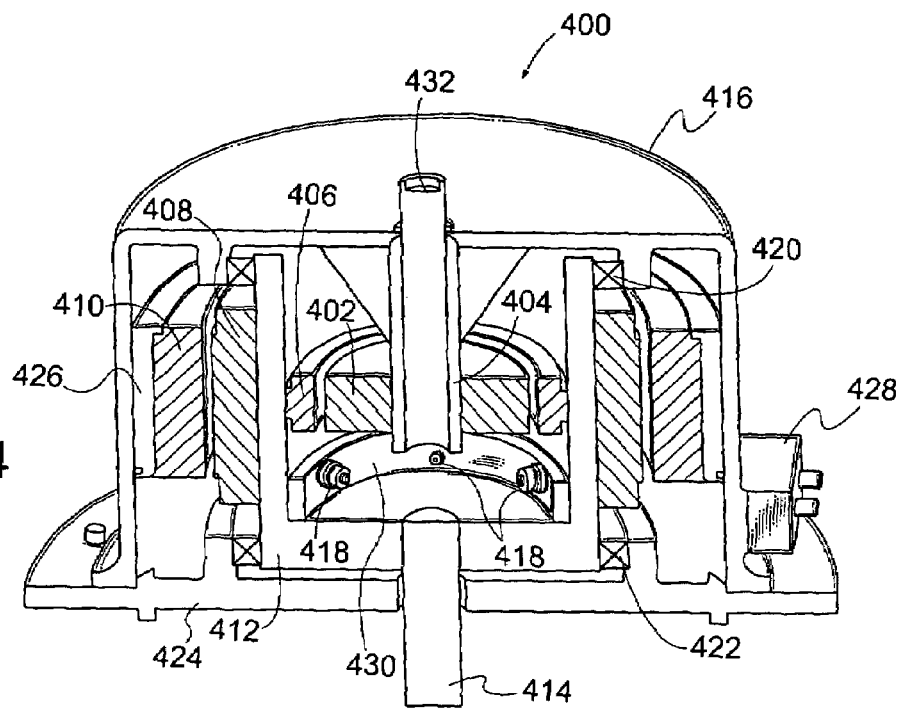
FIGS. 4 and 5 illustrate cross-sectional views of an electric generator, similar to the generator illustrated in FIG. 2, according to one embodiment of the invention.
Figure 5:
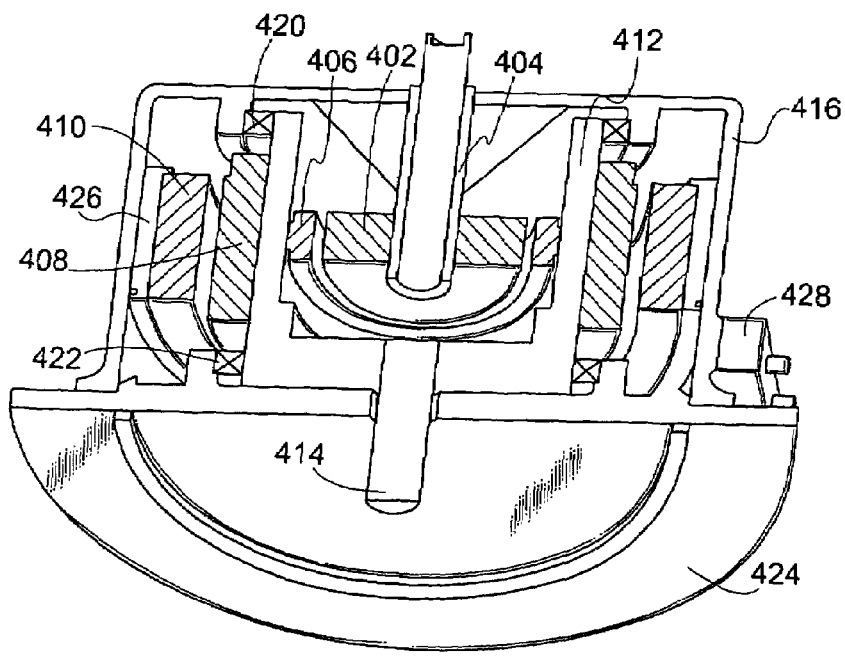

FIGS. 4 and 5 illustrate cross-sectional views of an electric generator 400, similar to the generator illustrated in FIG. 2, according to one embodiment of the invention. The generator in FIGS. 4 and 5 includes an exciter stator 402 coupled to a support member 404 and disposed within the generator enclosure 416, the exciter rotor 406 is coupled to the inner surface of the rotor frame 412 and the main rotor 408 is coupled to the outer surface of the rotor frame 412, the main stator 410 is positioned around the inner surface of the generator enclosure 416, bearings 420 and 422 are mounted around the rotor frame 412, and a driveshaft 414 is coupled to the rotor frame 412 and protrudes beyond an enclosing flange 424. In one implementation of the invention, the main stator 410 is coupled to a stator sleeve 426 which is coupled to the inner surface of the generator enclosure 416. A terminal block 428 may provide the outputs (e.g. T1, T2, T4, and/or Neutral in FIG. 3) from the main stator 410. One embodiment of the invention also provides a diode ring assembly 430 on which the one or more diodes 418 may be mounted. According to various embodiments of the invention, direct current is delivered to the exciter stator 402 by wires along a passage 432 in the generator enclosure 416 and support member 404. In other embodiments of the invention, one or more electrically conductive terminals are positioned on the generator enclosure 416 to provide an electrical path to the exciter stator 402.

Figure 6:
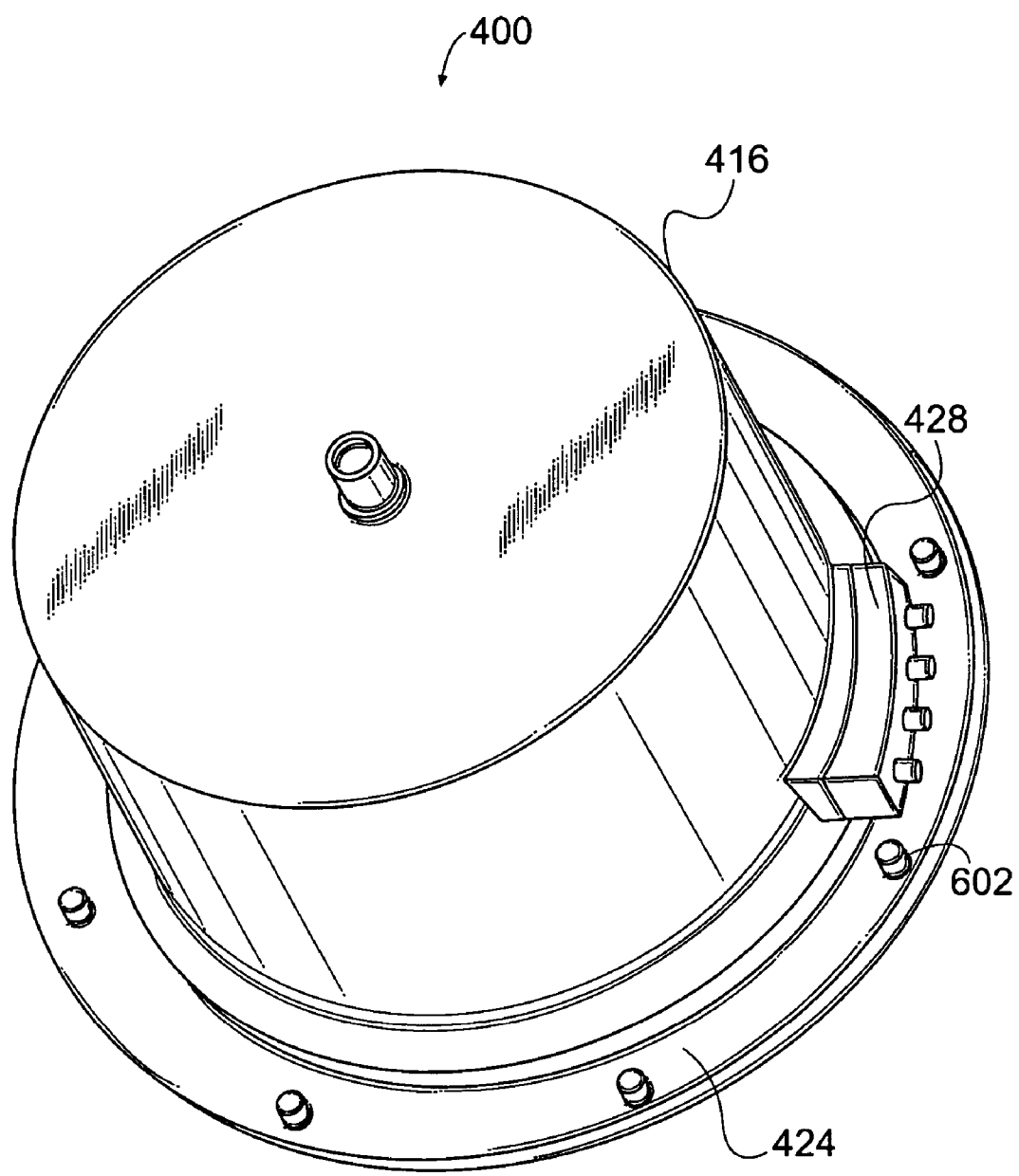
FIG. 6 illustrates an outer view of the electric generator illustrated in FIG. 2 according to one embodiment of the invention.

FIG. 6 illustrates an outer view of an electric generator, similar to the electric generator illustrated in FIGS. 4 and 5, according to one embodiment of the invention. The flange 424 may include a plurality of openings 602 which may be used to couple the generator 400 to a surface or another device.

In one embodiment of the invention, the exciter stator 402 is a single winding coil, the exciter rotor 406 includes N winding coils, where N is two or more, the main rotor 408 includes N winding coils, and the main stator 410 includes N winding coils.

According to various embodiments of the invention, the bearings 420 and 422 may be frictionless bearings or may be lubricated using oil.

In one implementation of the invention, cooling of the electromagnetic components of the generator may be achieved using spray oil or by conduction cooling using oil. In other implementations of the invention, cooling of the generator may be achieved by airflow or other cooling media and/or methods.

According to various applications of the short axial-length generator herein described, the generator may be used in hybrid electric vehicles, aircraft, power generation plants, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A generator comprising:
   a rotor frame including a cylindrical body, the cylindrical body having an inner surface, an outer surface, a first end, and a second end, the inner surface defining an interior cavity;
   a driveshaft coupled to the cylindrical body first end along an axis;
   a generator housing having an inner surface that defines a substantially cylindrical cavity about the axis;
   a first rotor armature coupled to the inner surface of the cylindrical body, the first rotor armature having electrical windings thereon and defining a space to receive a stator assembly;
   a second rotor armature coupled to the outer surface of the cylindrical body and having electrical windings thereon that are electrically coupled to the first rotor armature electrical windings;
   a first stator fixedly coupled to the generator housing and extending into the interior cavity via the cylindrical body second end, the first stator positioned within the space defined by the first rotor armature, having electrical windings thereon that are each electrically isolated from the first rotor armature electrical windings and the second rotor armature electrical windings, substantially aligned with the driveshaft along the axis, and not surrounding the drive shaft; and
   a second stator surrounding the second rotor armature, having electrical windings thereon that are each electrically isolated from the first rotor armature electrical windings and the second rotor armature electrical windings, and fixedly coupled to the generator housing inner surface.

2. The generator of claim 1 wherein a direct current applied to the first stator generates a static magnetic field which induces an alternating current in the first rotor armature when the driveshaft is rotated.

3. The generator of claim 2 further comprising:
   one or more rectifying diodes coupled between the first rotor armature and the second rotor armature, the one or more rectifying diodes to transform the alternating current in the first rotor armature into a direct current in the second rotor armature.

4. The generator of claim 3 wherein the one or more rectifying diodes are configured as a full-wave rectifying bridge.

5. The generator of claim 3 further comprising:
a diode ring assembly disposed within the interior cavity of cylindrical body of the rotor frame, the diode ring to secure the one or more rectifying diodes.

6. The generator of claim 3 wherein the direct current in the second rotor armature generates a magnetic field which, in turn, induces an alternating current in the second stator.

7. The generator of claim 3 wherein the direct current in the second rotor armature generates a magnetic field which, in turn, induces a three-phase voltage.

8. The generator of claim 7 further comprising:
a plurality of terminals electrically coupled to the second stator to provide the three-phase voltage.

9. The generator of claim 1 further comprising:
a flange coupled to the generator housing to enclose the first stator, second stator, first rotor armature and second rotor armature, the flange including a passage to permit the driveshaft to extend outside the generator housing.

10. The generator of claim 1 further comprising:
a plurality of bearings disposed within the generator housing to facilitate the rotation of the rotor frame.

11. The generator of claim 1 wherein the first rotor armature includes one or more windings.

12. The generator of claim 11 wherein the second rotor armature includes one or more windings corresponding to the windings in the first rotor armature.

13. A generator assembly comprising:
a cylindrical body, the cylindrical body having an inner surface, an outer surface, an axis, and defining an interior cavity;
a driveshaft coupled to the cylindrical body along the axis of the cylindrical body;
a generator housing having an inner surface that defines a substantially cylindrical cavity about the axis;
a first rotor assembly coupled to the inner surface of the cylindrical body, the first rotor assembly having electrical windings thereon and defining a space to receive a stator;
a first stator fixedly coupled to the generator housing and extending into the interior cavity, the first stator positioned within the space defined by the first rotor assembly, having electrical windings thereon that are each electrically isolated from the first rotor assembly electrical windings, substantially aligned with the driveshaft along the axis, and not surrounding the drive shaft;
a second rotor assembly coupled to the outer surface of the cylindrical body, the second rotor assembly having electrical windings thereon that are and electrically coupled to the first rotor assembly electrical windings and electrically isolated from each of the first stator assembly electrical windings; and
a second stator fixedly coupled to the generator housing inner surface, the second stator arranged around the second rotor assembly and radially positioned about the axis of the cylindrical body, and having electrical windings thereon that are each electrically isolated from the first rotor assembly electrical windings and the second rotor assembly electrical windings.

14. The generator assembly of claim 13 wherein a direct current applied to the first stator generates a static magnetic field which induces an alternating current in the first rotor assembly when the driveshaft and cylindrical body are rotated, the alternating current in the first rotor assembly is rectified to generate a direct current in the second rotor assembly, the direct current in the second rotor assembly generates a magnetic field which, in turn, induces an alternating current in the second stator.

15. The generator assembly of claim 14 further comprising:
one or more rectifying diodes coupled between the first rotor assembly and the second rotor assembly, the one or more rectifying diodes to transform the alternating current in the first rotor assembly into a direct current in the second rotor assembly.

16. The generator assembly of claim 15 wherein the one or more rectifying diodes are configured as a full-wave rectifying bridge.

17. The generator assembly of claim 13 wherein a direct current applied to the first stator generates a static magnetic field which induces an alternating current in the first rotor assembly when the driveshaft is rotated.

18. An electric generator comprising:
a cylindrical body, the cylindrical body having an inner surface, an outer surface, an axis, and defining an interior cavity;
a driveshaft coupled to the cylindrical body along the axis of the cylindrical body;
a generator housing having an inner surface that defines a substantially cylindrical cavity about the axis;
a first rotor assembly coupled to the inner surface of the cylindrical body, the first rotor assembly having electrical windings thereon and defining a space to receive a stator;
a first stator fixedly coupled to the generator housing and extending into the interior cavity, the first stator positioned within the space defined by the first rotor assembly, having electrical windings thereon that are each electrically isolated from the first rotor assembly electrical windings, substantially aligned with the driveshaft along the axis, and not surrounding the drive shaft, such that when a direct current is applied to the first stator electrical windings a static magnetic field is generated which induces an alternating current in the first rotor assembly windings when the driveshaft and cylindrical body are rotated;
a second rotor assembly coupled to the outer surface of the cylindrical body, the second rotor assembly having electrical windings thereon that are and electrically coupled to the first rotor assembly electrical windings and electrically isolated from each of the first stator assembly electrical windings;
one or more rectifying diodes coupled between the first rotor assembly windings and the second rotor assembly windings the alternating current in the first rotor assembly windings is rectified by the one or more rectifying diodes to generate a direct current in the second rotor assembly windings, the direct current in the second rotor assembly windings generates a magnetic field; and
a second stator fixedly coupled to the generator housing inner surface, the second stator arranged around the second rotor assembly and radially positioned about the axis of the cylindrical body, and having electrical windings thereon that are each electrically isolated from the first rotor assembly electrical windings and the second rotor assembly electrical windings, the magnetic field in the second rotor assembly windings induces an alternating current in the second stator windings.

* * * * *